(12) United States Patent
Sato

(10) Patent No.: US 8,334,890 B2
(45) Date of Patent: Dec. 18, 2012

(54) DISPLAY CONTROL APPARATUS, REMOTE CONTROL THAT TRANSMITS INFORMATION TO DISPLAY CONTROL APPARATUS, AND VIDEO CONFERENCE SYSTEM

(75) Inventor: Tomohiro Sato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 789 days.

(21) Appl. No.: 12/461,015

(22) Filed: Jul. 29, 2009

(65) Prior Publication Data

US 2010/0033549 A1 Feb. 11, 2010

(30) Foreign Application Priority Data

Aug. 5, 2008 (JP) ................. 2008-201485

(51) Int. Cl.
H04N 7/14 (2006.01)
(52) U.S. Cl. ............... 348/14.08; 348/14.09; 348/14.12
(58) Field of Classification Search .... 348/14.01–14.16; 715/753, 755, 751; 709/204, 205; 370/260–261; 345/157

See application file for complete search history.

(56) References Cited

U.S. PATENT DOCUMENTS 7,091,949 B2 * 8/2006 Hansen ..................... 345/158

FOREIGN PATENT DOCUMENTS

| JP | A-07-298235 | 11/1995 |
| JP | A-2004-362231 | 12/2004 |
| JP | A-2005-267500 | 9/2005 |

OTHER PUBLICATIONS

Japanese Patent Office, Notification of Reasons for Rejection mailed Jul. 10, 2012 in Japanese Patent Application No. 2008-201485 w/English-language Translation.

* cited by examiner

Primary Examiner — Melur Ramakrishnaiah
(74) Attorney, Agent, or Firm — Oliff & Berridge, PLC

(57) ABSTRACT

A display control apparatus that receives information from remote controls and that controls a display device. The display control apparatus includes a remote control information obtaining device that obtains remote control information, a display data creation device that creates display data for displaying pointers corresponding to the remote controls based on the remote control information, a display data output device that outputs the display data, a distance determination device that calculates a relative distance between display positions of the pointers and determines whether the relative distance is larger than a predetermined distance, and a driving signal transmission device that transmits, to at least one of the remote controls corresponding to the pointers for which the relative distance is equal to or less than the predetermined distance, a driving signal to cause a notification device provided in the remote control to be driven.

13 Claims, 16 Drawing Sheets

| USER ID | USER NAME | | DEPARTMENT OR ORGANIZATION | LOGIN STATUS |
|---|---|---|---|---|
| | FAMILY NAME | GIVEN NAME | | |
| Y001 | KATO | TARO | ADMINISTRATIVE DEPARTMENT | ON |
| Y002 | SATO | JUNKO | HUMAN RESOURCES DEPARTMENT | ON |
| Y003 | OI | KUMIKO | BUSINESS DEPARTMENT | ON |
| Y004 | OTA | JIRO | DEVELOPMENT DEPARTMENT | ON |
| Y005 | KIMURA | SABURO | MANUFACTURING DEPARTMENT | OFF |
| ⋮ | ⋮ | ⋮ | ⋮ | ⋮ |

1310

| REMOTE CONTROL ID | USER ID | POINTER COORDINATE VALUE | | POINTER SHAPE |
|---|---|---|---|---|
| | | X COORDINATE | Y COORDINATE | |
| R001 | Y001 | -100 | +250 | ○ |
| R002 | Y002 | +80 | -50 | □ |
| R003 | Y003 | -300 | +280 | ⬠ |
| R004 | Y004 | +500 | -500 | △ |
| ⋮ | ⋮ | ⋮ | ⋮ | ⋮ |

| REMOTE CONTROL ID | REMOTE CONTROL ID | RELATIVE DISTANCE |
|---|---|---|
| R001 | R002 | 349.8 |
| R001 | R003 | 202.2 |
| R001 | R004 | 960.4 |
| R002 | R003 | 503.2 |
| R002 | R004 | 615.5 |
| R003 | R004 | 1117.3 |

| REMOTE CONTROL ID | USER ID | POINTER COORDINATE VALUE | | POINTER SHAPE |
|---|---|---|---|---|
| | | X COORDINATE | Y COORDINATE | |
| R001 | Y001 | −290 | +270 | ○ |
| R002 | Y002 | +80 | −50 | □ |
| R003 | Y003 | −300 | +280 | ⬠ |
| R004 | Y004 | +500 | −500 | △ |
| ⋮ | ⋮ | ⋮ | ⋮ | ⋮ |

| REMOTE CONTROL ID | REMOTE CONTROL ID | RELATIVE DISTANCE |
|---|---|---|
| R001 | R002 | 489.1 |
| R001 | R003 | 14.14 |
| R001 | R004 | 1103.1 |
| R002 | R003 | 503.2 |
| R002 | R004 | 615.5 |
| R003 | R004 | 1117.3 |

| REMOTE CONTROL ID | USER ID | POINTER COORDINATE VALUE | | POINTER SHAPE | CHANGE STATE |
| --- | --- | --- | --- | --- | --- |
| | | X COORDINATE | Y COORDINATE | | |
| R001 | Y001 | −290 | +270 | ○ | 0 |
| R002 | Y002 | +80 | −50 | □ | 0 |
| R003 | Y003 | −300 | +280 | ⬠ | 1 |
| R004 | Y004 | +500 | −500 | △ | 0 |
| ⋮ | ⋮ | ⋮ | ⋮ | ⋮ | ⋮ |

DISPLAY CONTROL APPARATUS, REMOTE CONTROL THAT TRANSMITS INFORMATION TO DISPLAY CONTROL APPARATUS, AND VIDEO CONFERENCE SYSTEM

CROSS-REFERENCE TO RELATED APPLICATION

This application claims priority to Japanese Patent Application No. 2008-201485, filed Aug. 5, 2008, the disclosure of which is hereby incorporated by reference herein in its entirety.

BACKGROUND

The present disclosure relates to a display control apparatus that receives information from a plurality of remote controls and controls a display device, a remote control that transmits information to the display control apparatus, and a video conference system.

A video conference system is known as a system that enables multipoint conferencing by transmitting and receiving video, audio and data between a plurality of points via a communication network. In such a video conference system, a video conference device at each of the points is provided with a common screen on which a conference video at each of the points is displayed and which is accessible by a plurality of conference participants. Further, with the video conference device, in order to point to a particular location on the common screen, a pointer is used by each of the conference participants who operates a remote control associated with each participant.

In this type of video conference system, for example, a speaker who is participating in the conference leads the discussion while using the pointer to point to a particular location on the common screen. Thus, the speaker can facilitate communication with the other conference participants.

SUMMARY

In the above video conference system, while the speaker leads the discussion while moving the pointer on the common screen by operating the remote control, the other conference participants participate in the conference using sight and hearing. When the speaker wants to express his or her opinion to a particular one of the other participants or get the attention of the particular one of the other participants, the speaker usually may usually speak to the particular participant using his/her voice. Therefore, if, for example, the particular conference participant fails to hear the speaker speaking to him or her, or cannot accurately hear his or her name due to surrounding noise, there may be a possibility that questions and answers at the conference will not proceed smoothly.

Various exemplary embodiments of the general principles herein provide a display control apparatus, a remote control that transmits information to the display control apparatus, and a video conference system that enables questions and answers at the conference to proceed smoothly.

The exemplary embodiments provide a display control apparatus that receives information from remote controls and that controls a display device. The display control apparatus includes a remote control information obtaining device, a display data creation device, a display data output device, a distance determination device, and a driving signal transmission device. The remote control information obtaining device obtains remote control information that includes, of pointer coordinate information and remote control identification information, at least the remote control identification information. The pointer coordinate information is position information for displaying a pointer corresponding to each of the remote controls on the display device. The remote control identification information is information for identifying each of the remote controls. The display data creation device creates display data for displaying pointers on the display device, based on the remote control information obtained by the remote control information obtaining device. The display data includes identification information corresponding to the remote control identification information. The display data output device outputs to the display device the display data created by the display data creation device. The distance determination device calculates a relative distance between display positions of the pointers on the display device based on the remote control information obtained by the remote control information obtaining device, and determines whether the relative distance is larger than a predetermined distance. The driving signal transmission device transmits a driving signal to a drive target remote control. The driving signal causes a notification device provided in the drive target remote control to be driven. The drive target remote control is at least one of remote controls corresponding to closely located pointers. The closely located pointers are the pointers for which the distance determination device has determined that the relative distance is equal to or less than the predetermined distance.

The exemplary embodiments also provide a remote control that includes a remote control information transmission device that transmits to the display control apparatus the remote control information including at least the remote control identification information, a notification device that gives a notification to an operator of the remote control, a driving signal receiving device that receives from the display control apparatus the driving signal for causing the notification device to be driven, and a driving device that drives the notification device in response to the driving signal.

The exemplary embodiments also provide a video conference system that includes terminal devices mutually connected via a network, each of the terminal devices being connected to a remote control and a display device. The video conference system includes a remote control information obtaining device, a display data creation device, a display data output device, a distance determination device, and a driving signal transmission device. The remote control information obtaining device obtains remote control information that includes, of pointer coordinate information and remote control identification information, at least the remote control identification information. The pointer coordinate information is position information for displaying a pointer corresponding to each of the remote controls on the display device. The remote control identification information is information for identifying each of the remote controls. The display data creation device creates display data for displaying pointers on the display device, based on the remote control information obtained by the remote control information obtaining device. The display data includes identification information corresponding to the remote control identification information. The display data output device outputs to the display device the display data created by the display data creation device. The distance determination device calculates a relative distance between display positions of the pointers on the display device based on the remote control information obtained by the remote control information obtaining device, and determines whether the relative distance is larger than a predetermined distance. The driving signal transmission device that transmits a driving signal to a drive target remote control, the driving signal causing a notification device provided in the drive target remote control to be driven, the drive target remote control being at least one of remote controls corresponding to closely located pointers, the closely located pointers being the pointers for which the distance determination device has determined that the relative distance is equal to or less than the predetermined distance.

BRIEF DESCRIPTION OF THE DRAWINGS

Exemplary embodiments of the present disclosure will be described below in detail with reference to the accompanying drawings in which:

FIG. 4 is an explanatory diagram showing a user database storage area;

FIG. 10 is an explanatory diagram of pointer relative distance data;

FIG. 11 is an explanatory diagram showing a remote control information data table;

FIG. 12 is an explanatory diagram of pointer relative distance data;

FIG. 15 is an explanatory diagram showing a remote control information data table that is used when display state change processing is performed.

DETAILED DESCRIPTION OF EMBODIMENTS

Figure 1:
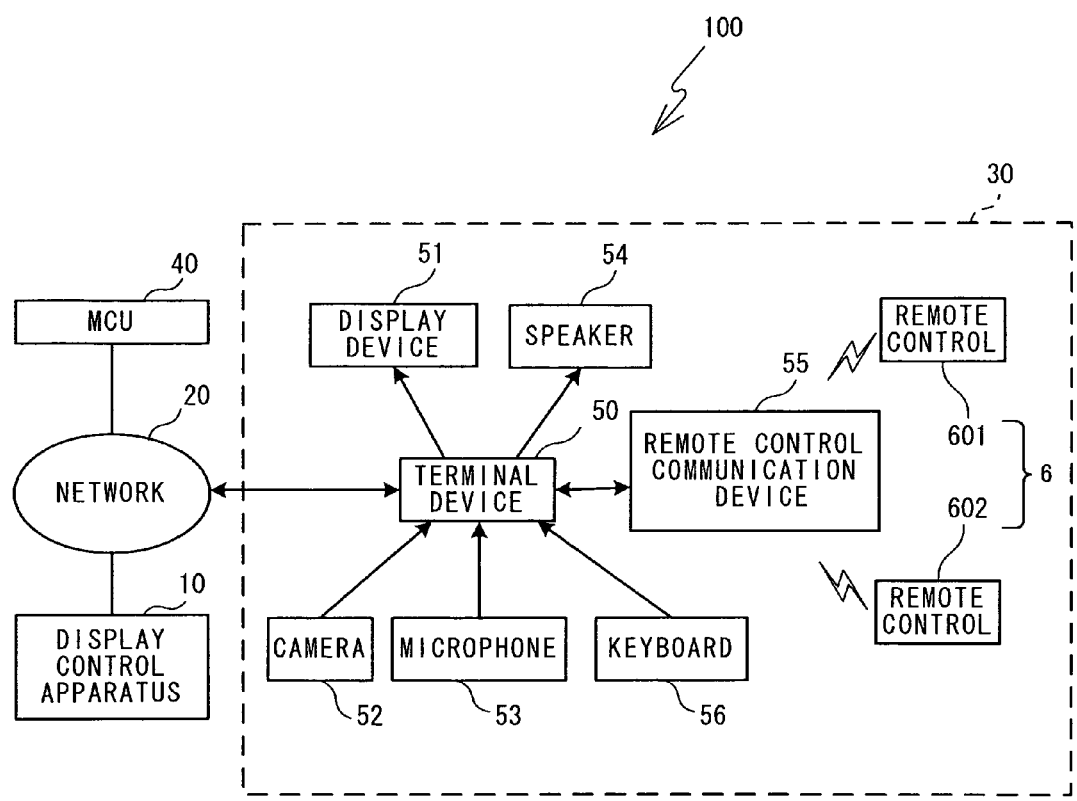
FIG. 1 is a system configuration diagram showing a schematic configuration of a video conference system.

Hereinafter, an embodiment will be described with reference to the appended drawings. Note that, the appended drawings are used to explain technical features that can be adopted and the structures of the devices in the drawings and the flowcharts of various processes are only explanatory examples, and the present invention is not intended to be limited thereto.

First, the overall configuration of a video conference system 100 according to the present embodiment will be described with reference to FIG. 1.

As shown in FIG. 1, the video conference system 100 includes a display control apparatus 10 serving as a server, a multipoint control unit 40, and a video conference terminal device 50 provided at a base 30, all of which are connected to a network 20. Hereinafter, the video conference terminal device 50 will be simply referred to as the terminal device 50. An internet protocol (IP) network and an integrated services digital network (ISDN), for example, may be used as the network 20. Although only one base 30 is shown in FIG. 1, actually a plurality of bases 30 is present. The plurality of bases 30 may be positioned in the same site of a company, for example, or may be located in different business offices, different districts, or different countries.

The display control apparatus 10 may be, for example, a known personal computer, which is a general purpose device. The display control apparatus 10 performs various types of processing relating to a video conference (hereinafter, simply referred to as a conference) that is conducted using the terminal devices 50 provided at the plurality of bases 30 connected via the network 20. The configuration of the display control apparatus 10, and the various types of processing performed by the display control apparatus 10 will be described later.

The multipoint control unit 40 is connected, via the network 20, to the terminal devices 50 provided at the plurality of bases 30. The multipoint control unit 40 may be a known device that makes it possible to hold a video conference among multiple points by relaying images, audio, data, and the like from the terminal devices 50. Hereinafter, the multipoint control unit 40 will be simply referred to as the MCU 40.

A known video conference terminal device that incorporates a codec may be used as the terminal device 50. The codec can compressively encode image and audio data and transmit the encoded data. Further, the codec can decode the received compressively encoded image and audio data, and output the decoded data. A display device 51 that displays an image transmitted from the MCU 40, a camera 52 that shoots the conference participants at each of the bases 30, a microphone 53 that inputs audio, a speaker 54 that outputs audio, and an input device 56 such as a keyboard are connected to the terminal device 50. Further, a remote control 6 (remote controls 601 and 602) is connected to the terminal device 50 via a remote control communication device 55. The remote control 6 may be used when each conference participant gives an instruction to display the pointer on the display device 51.

The remote control 6 transmits remote control information to the remote control communication device 55 through an infrared ray. The remote control information may include, for example, pointer coordinate information and a remote control ID. The pointer coordinate information is information that indicates a position on a display screen of the display device 51 pointed by the remote control 6. The remote control ID is identification information for identifying each remote control. The remote control communication device 55 is provided with an infrared ray receiving circuit, and receives a signal transmitted from the remote control 6. Instead of the above-described infrared ray, a signal line, wireless communication or the like may be used for communication between the remote control 6 and the remote communication device 55. The terminal device 50 outputs the remote control information obtained by the remote control communication device 55 to the display control apparatus 10 periodically (for example, every 20 milliseconds). The display control apparatus 10 creates display data based on the remote control information received from the plurality of bases 30, and causes the display device 51 to display the pointers via the terminal device 50 provided at each of the bases 30. The display states of the pointers on the display device 51 will be described later.

Next, electrical configurations of the display control apparatus 10 and the remote control 6 will be described with reference to FIG. 2 to FIG. 4.

Figure 2:
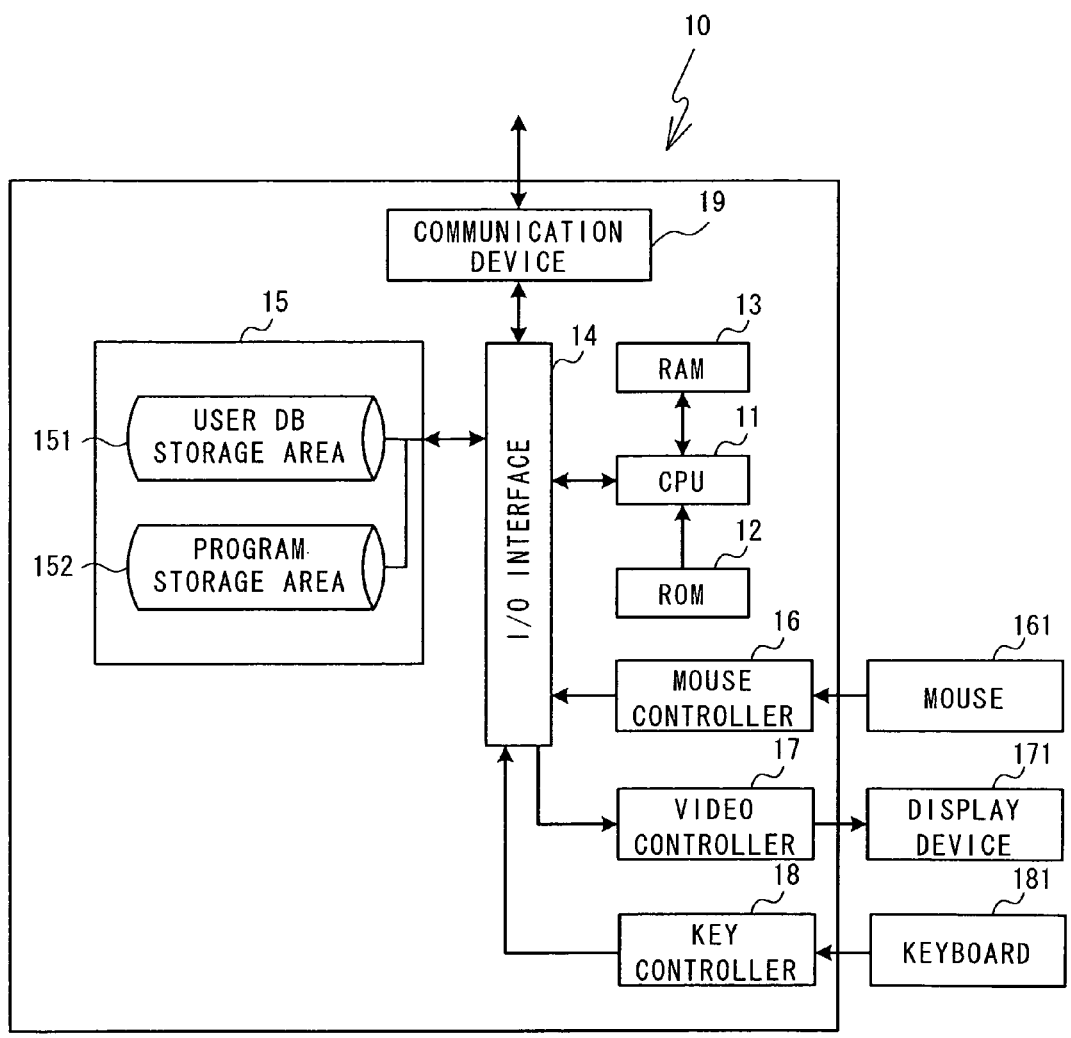
FIG. 2 is a block diagram showing an electrical configuration of a display control apparatus.
Figure 3:
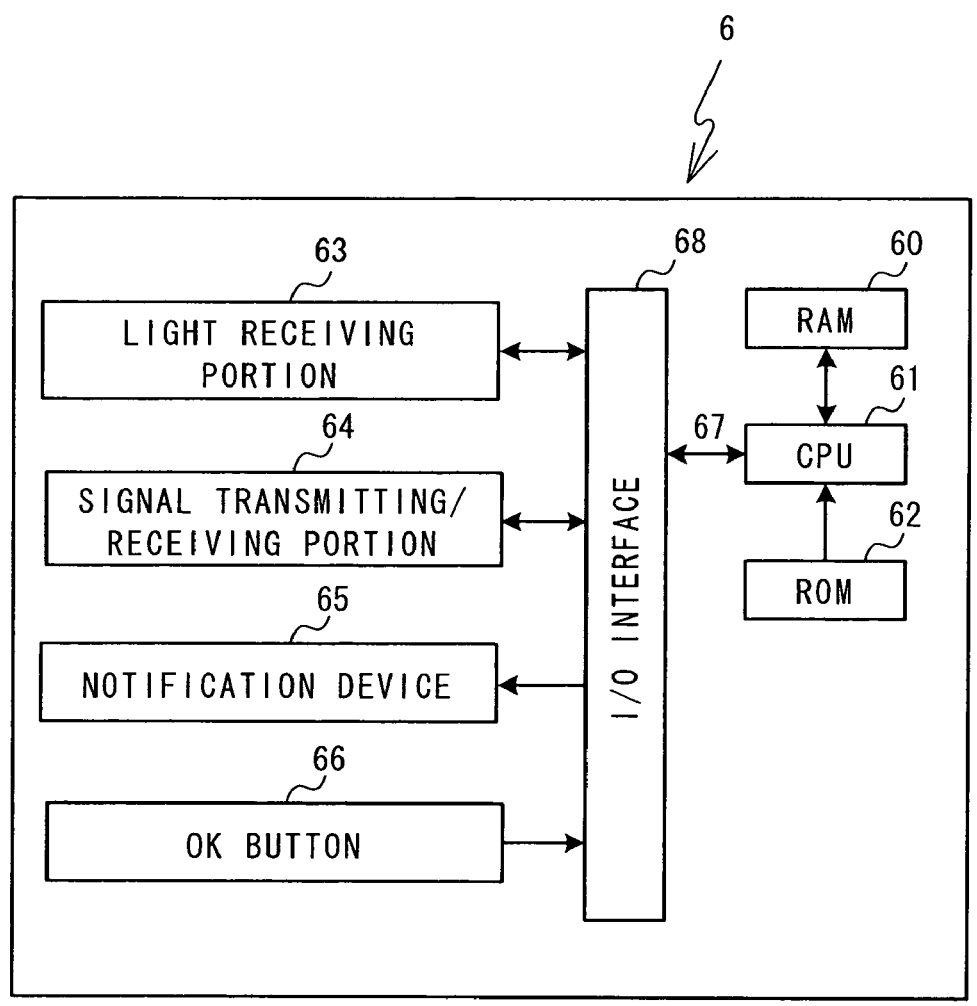
FIG. 3 is a block diagram showing an electrical configuration of a remote control.

As shown in FIG. 2, the display control apparatus 10 is provided with a CPU 11, and a ROM 12 and a RAM 13 that are respectively connected to the CPU 11. Further, an input/ output (I/O) interface 14 is connected to the CPU 11. A storage device 15, a mouse controller 16, a video controller 17, a key controller 18, and a communication device 19 are connected to the I/O interface 14. A hard disk drive (hereinafter referred to as an HDD), for example, may be used as the storage device 15.

The CPU 11 controls all functions of the display control apparatus 10. The ROM 12 stores various types of programs for operating the display control apparatus 10, including a basic input/output system (BIOS), and set values for the programs. The CPU 11 controls the operation of the display control apparatus 10 according to the programs stored in the ROM 12, and the HDD 15 to be described later. The RAM 13 is a storage device that temporarily stores various types of data. A mouse 161, a display device 171 and a keyboard 181 are respectively connected to the mouse controller 16, the video controller 17 and the key controller 18. The communication device 19 is connected to the network 20, and transmits and receives data to and from an external device such as the terminal device 50.

The HDD 15 will now be described in detail. As shown in FIG. 2, the HDD 15 is provided with a plurality of storage areas including a user database storage area (hereinafter referred to as a user DB storage area) 151, and a program storage area 152.

A user DB 1510 (refer to FIG. 4) is stored in the user DB storage area 151 (refer to FIG. 2). The user DB 1510 stores information relating to users (hereinafter referred to as user information) who respectively use the remote control 6 at each of the bases 30. The user information is created for each user. For example, the user information may include a user ID, user name, department or organization, and login status, as shown in FIG. 4. The user ID is a unique identification code that is assigned to each user. The user name is the name of the user, and is divided into the family name and the given name and stored. The department or organization is the name of the department or the name of the company or association to which the user belongs. The user information may be information that is inputted and registered in advance by the user.

The login status is stored such that ON indicates that the user is participating in the conference and OFF indicates that the user is not participating in the conference. When the user participates in the conference at each of the bases 30, if the user registers the user's ID in the terminal device 50, ON is stored as the login status of the user. When the conference ends, or the user inputs to the terminal device 50 that the user is leaving the conference before its end, the login status of the user is updated and OFF is stored. The user information may further include other information relating to the user, such as, for example, the user's telephone number, e-mail address and title. Although user information for only five users is shown in FIG. 4 for explanatory convenience, the number of pieces of the user information stored in the user DB 1510 is not limited to this example.

Although not shown in detail, various types of programs that cause the display control apparatus 10 to execute various processing are stored in the program storage area 152 shown in FIG. 2. For example, a program stored on a CD-ROM may be installed via a CD-ROM drive (not shown in the figures) and stored in the program storage area 152. Alternatively, a program downloaded via the network 20 may be stored in the program storage area 152. In addition, set values to be used in various processing are also stored in the HDD 15.

The electrical configuration of the remote control 6 will be described with reference to FIG. 3. As shown in FIG. 3, the remote control 6 is provided with a CPU 61 that controls the remote control 6, a RAM 60, a ROM 62, and an input/output (I/O) interface 68, which are mutually connected by a bus 67. A light receiving portion 63, a signal transmitting/receiving portion 64, a notification device 65, and an OK button 66 are respectively connected to the I/O interface 68. The light receiving portion 63, the signal transmitting/receiving portion 64, the notification device 65, and the OK button 66 operate under control of the CPU 61. When the signal transmitting/receiving portion 64 receives a driving signal transmitted from the display control apparatus 10 via the terminal device 50, the notification device 65 gives notification to the user of the remote control 6. Preferably, a vibration generating device that vibrates the remote control itself may be used as the notification device 65.

Although the configuration of the vibration generating device is not shown in the drawings, a general purpose vibration generating device may be used. In the general purpose vibration generating device, vibration may be generated, for example, by attaching a weight with a biased center of gravity to a shaft of a small motor and rotating the shaft. In this case, the remote control 6 can perform a notification operation by applying vibration to a part of the body, such as a hand, of the user. Therefore, the remote control 6 can be used to communicate with the user or to call the user's attention more effectively. Instead of the vibration generating device, an audio generating device, a light emitting device or the like may be used as the notification device 65. In the following explanation of the embodiments, the vibration generating device is exemplified as the notification device 65, and referred to as the vibration generating device 65.

The OK button 66 is used for the operation of the remote control 6. When the user presses the OK button 66, the signal transmitting/receiving portion 64 transmits a signal, as remote control operation information, to the remote control communication device 55.

The remote control 6 serves as a pointing device, and gives an instruction to display the pointer on the display screen of the display device 51. For example, the light receiving portion 63 detects light emitted from a light source of a light emitting portion (not shown in the drawings) provided in the vicinity of the display screen of the display device 51. The CPU 61 analyzes, based on the detected position of the light source, a position on the display screen of the display device 51 pointed by the remote control 6, and creates pointer coordinate information that indicates the position. The signal transmitting/receiving portion 64 transmits the pointer coordinate information through the infrared ray to the remote control communication device 55. Alternatively, the pointer coordinate information may be generated in a similar way, by the display device 51 detecting the light emitted from the remote control 6.

The remote control 6 may be a device that has a similar structure as a general purpose mouse, a track ball or a joystick, as log as the user can operate the device while holding the device in the hand. It is also acceptable that the terminal device 50 creates the pointer coordinate information, based on a direction and an amount of the movement of the device operated by the user.

Next, various processing performed by the display control apparatus 10 in the present embodiment will be described with reference to FIG. 5 to FIG. 12.

First, with reference to FIG. 5, an example of the display state of pointers (601A, 602B, 603C and 604D) that are displayed on the display device 51 (display devices 511 and 512) at each of the bases (hereinafter referred to as a base 301 and a base 302) will be described.

The base 301 and the base 302 respectively correspond to the base 30 of FIG. 1, and are located apart from each other.

The two terminal devices 50 respectively provided at the base 301 and the base 302 are connected to the display control apparatus 10 via the network 20. At the base 301, a user 3011 and a user 3012 are participating in the conference. The user 3011 is operating the remote control 601, which corresponds to the remote control 6 of FIG. 1, to control the pointer 601A on the screen of the display device 511. The user 3012 is operating the remote control 602 to control the pointer 602B. In the same manner, at the base 302, a user 3021 and a user 3022 are participating in the conference. The user 3021 is operating a remote control 603 to control the pointer 603C on the display screen of the display device 512. The user 3022 is operating a remote control 604. However, the user 3022 is not pointing the remote control 604 toward the display device 512. Accordingly, the pointer 604D corresponding to the remote control 604 is displayed at a predetermined position (in the example shown in FIG. 5, at the right lower corner of the screen of each of the display devices 511 and 512) and does not move.

Figure 5:
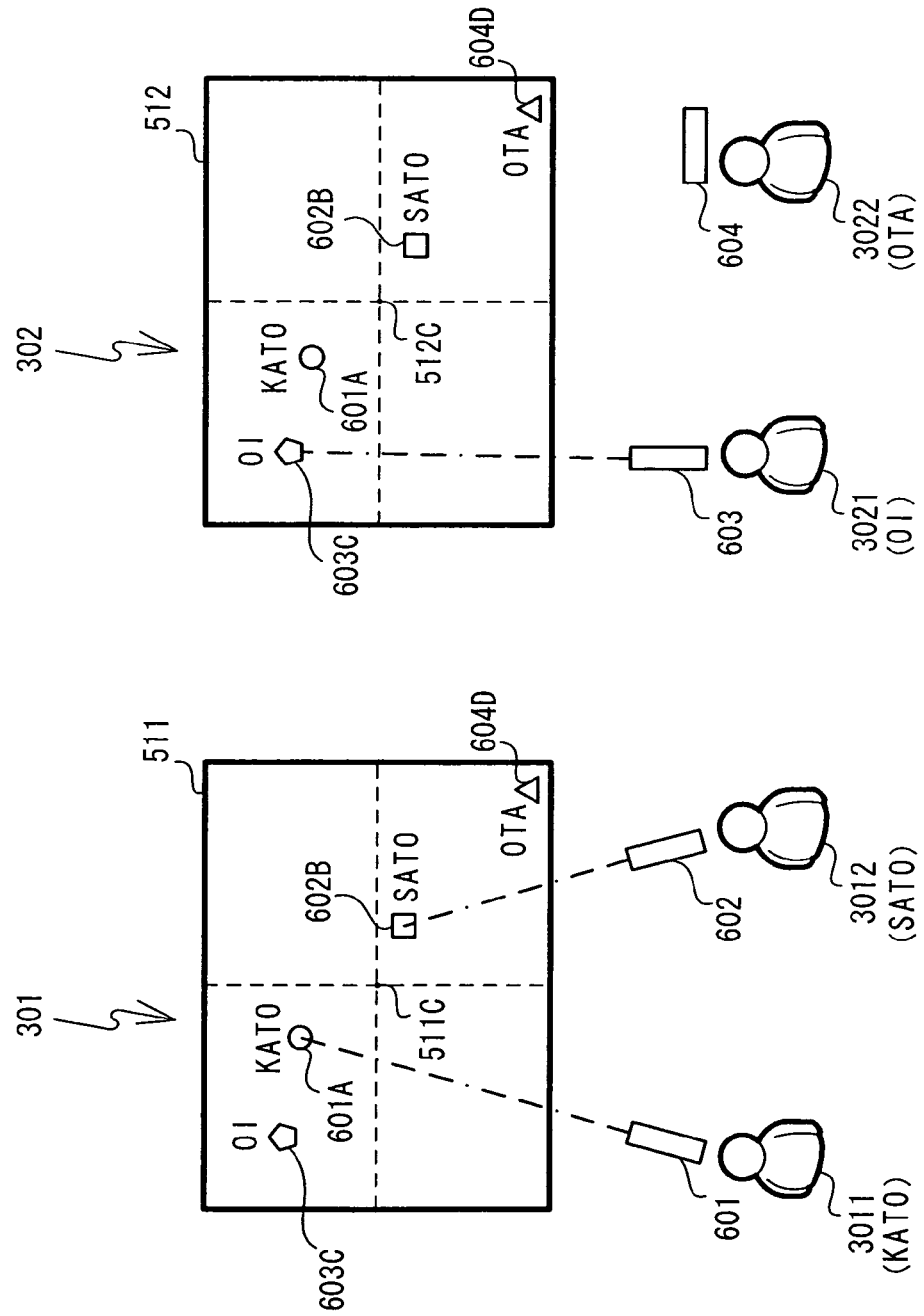
FIG. 5 is an explanatory diagram showing display states of pointers.

Further, in the present embodiment, user names (Kato, Sato, Oi and Ota) are displayed near the pointers as shown in FIG. 5. Therefore, it is possible to identify the user who is controlling each pointer. The remote controls 601 to 604 are associated with the users such that, for example, when the user inputs the user ID to the terminal device 50 at each base when the user starts to participate in the conference, the user registers which remote control the user uses. The shapes or the colors, or both the shapes and the colors of the respective pointers (601A, 602B, 603C and 604D) that are displayed may be different from each other. In the example shown in FIG. 5, the pointers 601A to 604D are displayed such that the pointer 601A has a circular shape, the pointer 602B has a square shape, the pointer 603C has a pentagonal shape, and the pointer 604D has a triangular shape. Therefore, even when the remote controls are not associated with the user IDs, if the users agree in advance which user is going to control which pointer shape, the user names need not necessarily be displayed. When the colors of the respective pointers (601A, 602B, 603C and 604D) are different from each other, or when both the shapes and the colors are different, the same effect can be obtained. Further, just the user's name may be displayed as the pointer.

The pointers 603C and 604D that are controlled at the base 302 are also displayed on the display device 511 at the base 301, while the pointers 601A and 602B that are controlled at the base 301 are also displayed on the display device 512 at the base 302. Accordingly, the remote control operation states of the users at the bases located away from each other can be monitored. Although not shown in FIG. 5, the base 301 and the base 302 are respectively provided with the terminal device 50, the camera 52, the microphone 53 and the speaker 54 that are shown in FIG. 1. Therefore, it is needless to say that the conference can proceed while using video and audio of the users that participate in the conference at the respective bases 301 and 302.

A remote control information data table 1310 used in the present embodiment will be described in detail with reference to FIG. 9. The remote control information data table 1310 may be created when, for example, the user registers the user ID in the terminal device 50 at each base when the user starts to participate in the conference, and is stored in the RAM 13. The information of the remote control information data table 1310 is updated and stored in the pointer generation processing, which will be described later. The remote control information data table 1310 shown in FIG. 9 includes information that is obtained at a certain timing from the remote controls used at the base 301 and the base 302 shown in FIG. 5

The remote control ID is an ID that identifies the remote control 6 used at each base. The user ID is an ID that is inputted by the user to the terminal device 50 at each base when the user starts to participate in the conference, and that is associated with the remote control ID when the user ID is inputted. For example, the remote control ID R001 is associated with the user ID Y001 and stored, and the remote control ID R002 is associated with the user ID Y002 and stored.

The pointer coordinate value is a coordinate value that is divided into an X coordinate value in the X direction and a Y coordinate value in the Y direction, and that indicates a position of the display device 51 at which the user at each of the bases 30 points the remote control 6. In the display device 511 at the base 301, the X coordinate value is stored such that when a reference point 511C (refer to FIG. 5 and FIG. 6) at the center of the screen is used as a reference (X coordinate value is 0), a coordinate value on the right side is denoted with a plus sign and a coordinate value on the left side is denoted with a minus sign. In a similar manner, the Y coordinate value is stored such that when the reference point 511C is used as a reference (Y coordinate value is 0), a coordinate value on the upper side is denoted with a plus sign and a coordinate value on the left side is denoted with a minus sign. Similarly, also at the base 302, the coordinate value is determined using a reference point 512C (refer to FIG. 5 and FIG. 6) as a reference. When the remote control information data table 1310 is created, an initial value (for example, zero) is set for both the X coordinate value and the Y coordinate value. The remote control information is periodically transmitted to the display control apparatus 10 from the terminal device 50 at each of the bases 30. The CUP 11 updates and stores the pointer coordinate value in the pointer generation processing to be described later (S3 of FIG. 7).

Figure 9:
FIG. 9 is an explanatory diagram showing a remote control information data table.

In the example shown in FIG. 9, the X coordinate −100 and the Y coordinate +250 of the pointer coordinate value are stored in association with the remote control ID R001, and the X coordinate value +80 and the Y coordinate value −50 is stored in association with the remote control ID R002. Further, the X coordinate value +500 and the Y coordinate value −500 are stored in association with the remote control ID R004.

Each pointer shape is stored in association with the remote control ID when the remote control information data table 1310 is created. Further, the family name and the given name shown in FIG. 4 may be associated with the remote control ID and stored in the remote control information data table 1310. Instead of the pointer shape, or in addition to the pointer shape, the pointer color may be stored in the remote control information data table 1310. The pointer shape and color, and the family name and the given name can be changed if necessary, by changing the settings at the terminal device 50 provided at each of the bases 30.

Next, the pointer generation processing performed by the display control apparatus 10 will be described with reference to FIG. 7. The pointer generation processing is performed by the CPU 11 according to the program stored in the program storage area 152 of the HDD 15. The pointer generation processing is started when the power supply of the display control apparatus 10 is turned ON. While the power supply is ON, the pointer generation processing is repeatedly started after a predetermined time has elapsed from the end of the previous processing. First, it is determined whether the remote control information has been obtained from the terminal device 50 at any one of the bases 30 (step S1). More specifically, the power supply of the terminal device 50 at the base 30 is turned ON, and the terminal device 50 is connected to the display control apparatus 10 via the network 20. After that, if the remote control information of the remote control associated with the user who participates in the conference is transmitted from the terminal device 50, the CPU 11 determines that the remote control information has been obtained (YES at step S1). If the remote control information has not been obtained (NO at step S1), the CPU 11 is placed in a standby state until the remote control information is obtained.

When the remote control information has been obtained (YES at step S1), the CPU 11 determines whether the pointer coordinate information is included in the remote control information (step S2). If the pointer coordinate information is included (YES at step S2), remote control information storage processing is performed (step S3). More specifically, the CPU 11 stores, in the remote control information data table 1310 in the RAM 13, a pointer coordinate value based on the received pointer coordinate information. If the pointer coordinate information is not included in the obtained remote control information (NO at step S2), the CPU 11 stores, in the remote control information data table 1310, a predetermined pointer coordinate value in the display device 51 (step S4). If the pointer coordinate information is not included in the remote control information, the user is not pointing the remote control 6 toward the display device 51 to control the pointer. Therefore, in order to display the pointer corresponding to the remote control 6 even in such a state, the predetermined pointer coordinate value is stored in the remote control information data table 1310.

It may be preferable that the predetermined position is located at an outermost position on the screen of the display device 51 so as not to obstruct the progress of the conference. For example, in the remote control information data table 1310 shown in FIG. 9, the X coordinate value +500 and the Y coordinate value −500, which are stored in association with the remote control ID R004, correspond to a case where the predetermined pointer coordinate value is stored (step S4) when it is determined that the pointer coordinate information is not included in the remote control information in the processing of step S2 (NO at step S2). Although the predetermined position may be set in advance in the present embodiment, the setting may be changed at the terminal device 50 at each of the bases 30.

Next, based on the remote control information data table 1310 stored in the RAM 13, the CPU 11 performs display data creation processing (step S5). The display data is data for displaying pointer images on the screen of the display device 51 at each of the bases 30. The display data creation processing is periodically performed based on data items stored in the remote control information data table 1310 in the RAM 13. The user name stored in the user DB 1510 may be obtained based on the user ID corresponding to the remote control ID stored in the remote control information data table 1310. Then, display data may be created for the image that displays user information such as the user name near each pointer as shown in FIG. 5.

Next, the CPU 11 performs display data output processing (step S7), and outputs the display data to the display device 51 at each of the bases 30.

As a result of performing the above-described pointer generation processing, at each base, it is possible to display each of the pointers that are controlled by all the remote controls including the remote controls used at the other bases. At the base 301 shown in FIG. 5, the user 3011 with the user ID Y001 is pointing the remote control 601 with the remote control ID R001 toward the display device 511, and thereby controlling the pointer 601A. In the same manner, the user 3012 with the user ID Y002 is pointing the remote control 602 with the remote control ID R002, thereby controlling the pointer 602B. At the base 302, the user 3021 with the user ID Y003 is controlling the pointer 603C, but the user 3022 with the user ID Y004 is not pointing the remote control 604 with the remote control ID R004 toward the display device 512. Therefore, the pointer 604D corresponding to the remote control 604 is displayed at the predetermined outermost position on the screen of each of the display devices 511 and 512. In this manner, all the pointers are displayed on the screens of the display devices 511 and 512 at the base 301 and the base 302, respectively. Thus, the users participating in the conference can operate each of their remote controls while being aware of the remote control operation states of the other users.

Next, driving signal transmission processing will be described with reference to FIG. 8. In the driving signal transmission processing, vibration is generated in the remote controls corresponding to the pointers positioned close to each other. The pointers may be positioned close to each other when one of the users operates his or her remote control and controls his or her pointer to get closer to another user's pointer while looking at the screen of the display device during the conference.

Figure 7:
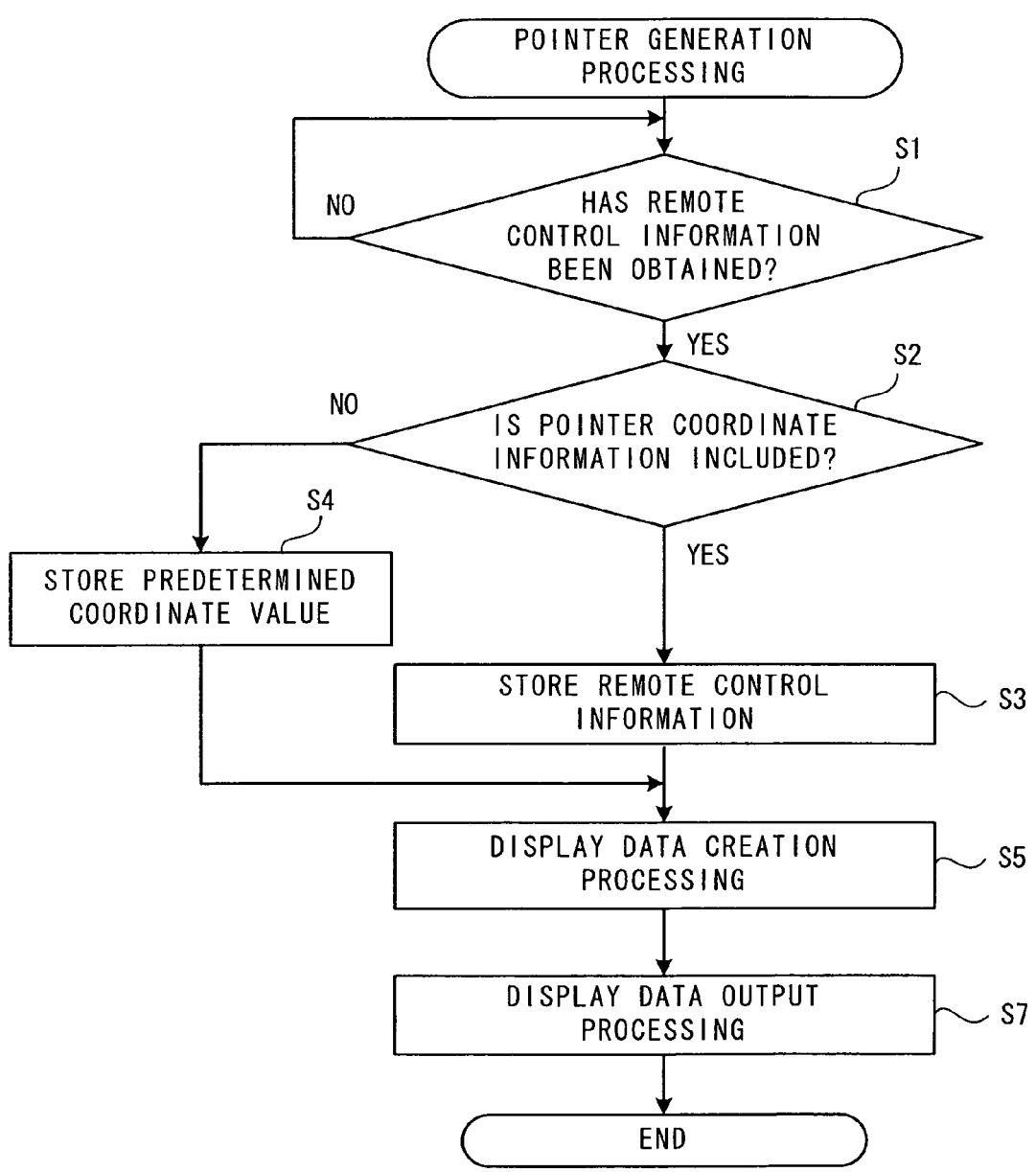
FIG. 7 is a flowchart of pointer generation processing that is performed by the display control apparatus.
Figure 8:
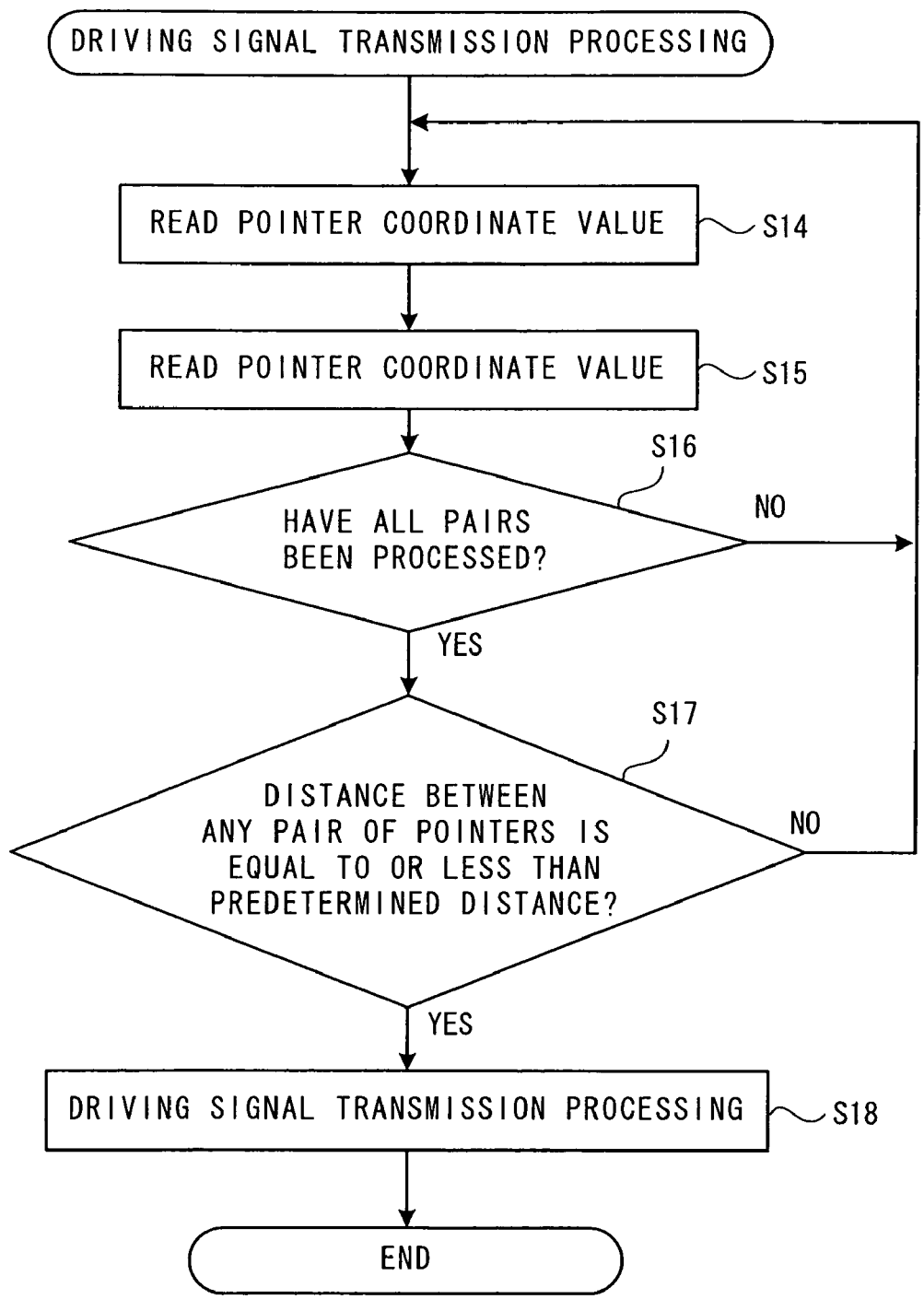
FIG. 8 is a flowchart of driving signal transmission processing.

The driving signal transmission processing shown in FIG. 8 is continuously and repeatedly performed, in parallel with the pointer generation processing shown in FIG. 7. As described earlier, the coordinate value of the pointer controlled by each of the remote controls is stored in the remote control information data table 1310 of the RAM 13, in the pointer generation processing. Therefore, the pointer coordinate value is read from the remote control information data table 1310 (step S14), and a relative distance between the pointers is calculated (step S15).

A method for calculating the relative distance between the pointers will be described. The relative distance is a distance between two pointers on the display screen that are apart from each other. For example, the Pythagorean theorem, which is a general theorem, may be used as the calculation method. For example, the relative distance between the pointers controlled by the remote controls corresponding to the remote control ID R001 and the remote control ID R002 in the remote control information data table 1310 can be obtained in the following manner.

$$\text{Relative distance} = \sqrt{\{(100+80)^2 + (250+50)^2\}} = 348.9\ldots$$

In the same way, the relative distance between the pointers controlled by the remote controls corresponding to the remote control ID R001 and the remote control ID R003 can be obtained in the following manner.

$$\text{Relative distance} = \sqrt{\{(300-100)^2 + (280-250)^2\}} = 202.2\ldots$$

This relative distance calculation processing is repeated (steps S14 and S15) while the processing has not been completed for all pairs of the remote controls (NO at step S16). When the processing has been completed for all the pairs (YES at step S16), relative distance data 1311 shown in FIG. 10 is stored in the RAM 13.

Then, it is determined whether there is a pair of the pointers that have a relative distance between them that is equal to or less than a predetermined distance (step S17). The predetermined distance used at this step is a set value that is stored in advance in a predetermined storage area of the HDD 15. In the present embodiment, the set value of the predetermined distance is 50. It may be appropriate to set, as the set value, a distance at which, when one user moves his or her pointer closer to another user's pointer, the pointers almost overlap with each other on the display screen. Further, the set value of the predetermined distance can be changed, if necessary, at the terminal device 50 at each of the bases 30 or by using the display control apparatus 10.

If there is no pair for which the relative distance is equal to or less than the predetermined distance 50 in the relative distance data 1311 shown in FIG. 10, in other words, there are no overlapping pointers as the example shown in FIG. 5 (NO at step S17), the CPU 11 returns to the processing at step S14.

Figure 6:
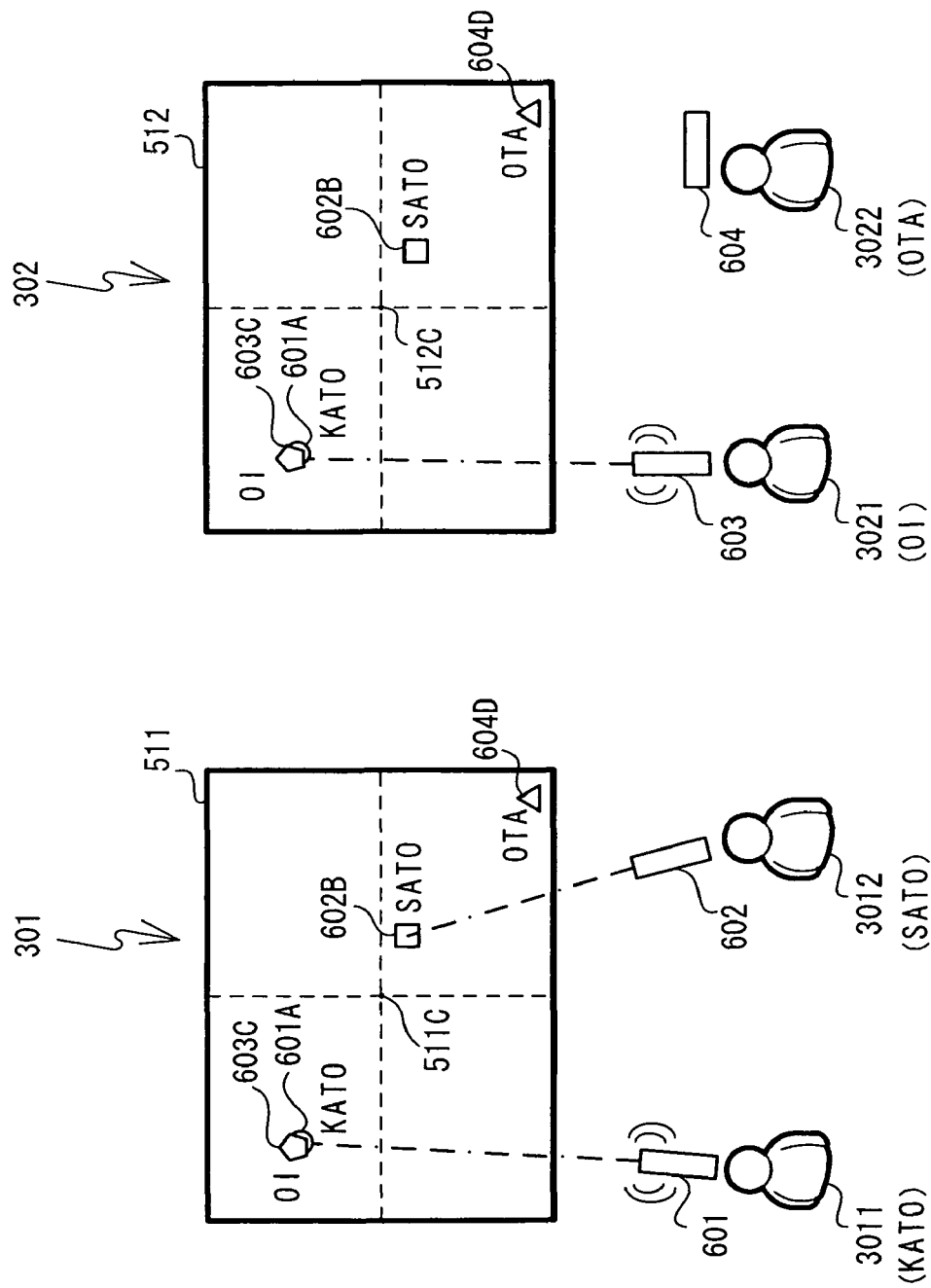
FIG. 6 is another explanatory diagram showing display states of the pointers.

In the example shown in FIG. 6, from the state shown in FIG. 5, the user 3011 at the base 301 has moved the user's pointer 601A close to the pointer 603C controlled by the user 3021. A remote control information data table 1312 of the RAM 13 in this state can be expressed as the table shown in FIG. 11, for example. As described above, the pointer coordinate value is read from the table 1312 (step S14), the pointer relative distance is calculated for all the pairs of the pointers (steps S15 and S16), and relative distance data 1313 shown in FIG. 12 is stored in the RAM 13.

Then, it is determined whether there is a pair of the pointers for which the relative distance is equal to or less than the predetermined distance of 50 in the relative distance data 1313 (step S17).

FIG. 6 shows a state where the user 3011 who is participating in the conference at the base 301 has operated the remote control 601 with the remote control ID R001 to move the pointer 601A onto the pointer 603C of the remote control 603 with the remote control ID R003 operated by the user 3021 at the base 302. Therefore, as shown in FIG. 12, in the relative distance data 1313 processed in the state of FIG. 6, the pair of the remote control IDs R001 and R003 indicates that the relative distance is equal to or less than the predetermined distance of 50. Therefore, it is determined at step S17 that there is a pair of the pointers, the distance between which is equal to or less than the predetermined distance (Yes at step S17). In this case, the CPU 11 performs processing to transmit a driving signal to the remote controls that control the pointers (step S18). The driving signal refers to a signal to drive the vibration generating device 65 in the remote control 6.

In the remote control 6, when the signal transmitting/receiving portion 64 receives the driving signal, the vibration generating device 65 is driven. Thus, vibration is generated in the remote control 6. In the example shown in FIG. 6, it is determined at step S17 that the distance between the pointers controlled by the remote controls corresponding to the remote control ID R001 and the remote control ID R003 is equal to or less than the predetermined distance. Therefore, the driving signal is transmitted to the remote control 601 corresponding to the remote control ID R001 and the remote control 603 corresponding to the remote control ID R003, and vibration is generated in the remote controls 601 and 603. Thus, the user 3011 who operates the remote control 601 can utilize the vibrations of the remote controls being used to communicate with or get the attention of the user 3021 who is operating the remote control 603, by moving the pointer close to the pointer of the user 3021. Especially, when the user information such as the user name is displayed near each of the pointers as shown in FIG. 6, the user can identify one of the other users to whom the user wants to speak or whose attention the user wants to get, more effectively and without a mistake.

As shown in FIG. 6, the pointer 604D of the user 3022 at the base 302, who is not pointing the remote control 604 toward the display device 512, is displayed without moving at the predetermined outermost position on the screen. Therefore, even when another user wants to speak to or call the attention of the user such as the user 3022 utilizing vibration of the remote controls, the user who wants to speak can generate vibration in the remote control 604 corresponding to the fixed pointer 604D, by moving the pointer controlled by that user close to the fixed pointer 604D. Thus, even if a user has put the user's remote control on a desk or the like, or even if the user is holding the remote control in the hand but is not pointing the remote control toward the display device, the user can reliably be made aware that another user is trying to communicate with the user by vibration of the user's remote control.

Next, driving signal transmission processing according to a first modified embodiment will be described with reference to FIG. 13. In the driving signal transmission processing according to the first modified embodiment shown in FIG. 13, the processing from reading the pointer coordinate value (step S104) to determining as to whether there is a pair of pointers that have a distance between them which is equal to or less than a predetermined distance (step S107) is the same as the processing performed at step S14 to step S17 shown in FIG. 8.

When it is determined that there is a pair of pointers whose relative distance is equal to or less than the predetermined distance (YES at step S107), a timer is reset for counting an elapsed time during which the relative distance is maintained to be equal to or less than the predetermined distance after it has been determined that the relative distance is equal to or less than the predetermined distance. Then, the count of the elapsed time is started (step S111). Along with this, information that identifies the pair of pointers whose relative distance is equal to or less than the predetermined distance is stored in the RAM 13.

Next, it is determined whether a predetermined time has elapsed. More specifically, it is determined whether the elapsed time counted by the timer is equal to or more than the predetermined time (step S112). The predetermined time may be a set value of a time period during which the respective users need to maintain their pointers close to each other within the predetermined distance. For example, approximately one to ten seconds may be taken to be an appropriate time for the users to maintain the pointers to be close to each other. The set value of the predetermined time may be stored in the HDD 15 in advance. However, the set value may be changed, if necessary, at the terminal device 50 at each of the bases 30, or at the display control apparatus 10.

When it is determined that the predetermined time has not elapsed (NO at step S112), the pointer coordinate values of the pointers, for which it has been determined at step S107 that the relative distance is equal to or less than the predetermined distance, are read again (step S113), and the relative distance between the pointers is calculated (step S114). Then, it is determined whether the relative distance is continuously maintained to be equal to or less than the predetermined distance (step S115). When the relative distance is continuously maintained to be equal to or less than the predetermined distance (YES at step S115), it is determined again whether the predetermined time has elapsed (step S112). When the predetermined time has not yet elapsed (NO at step S112), it is observed, once again, whether the relative distance between the pointers is continuously maintained to be equal to or less than the predetermined distance (steps S113 to S116).

Figure 13:
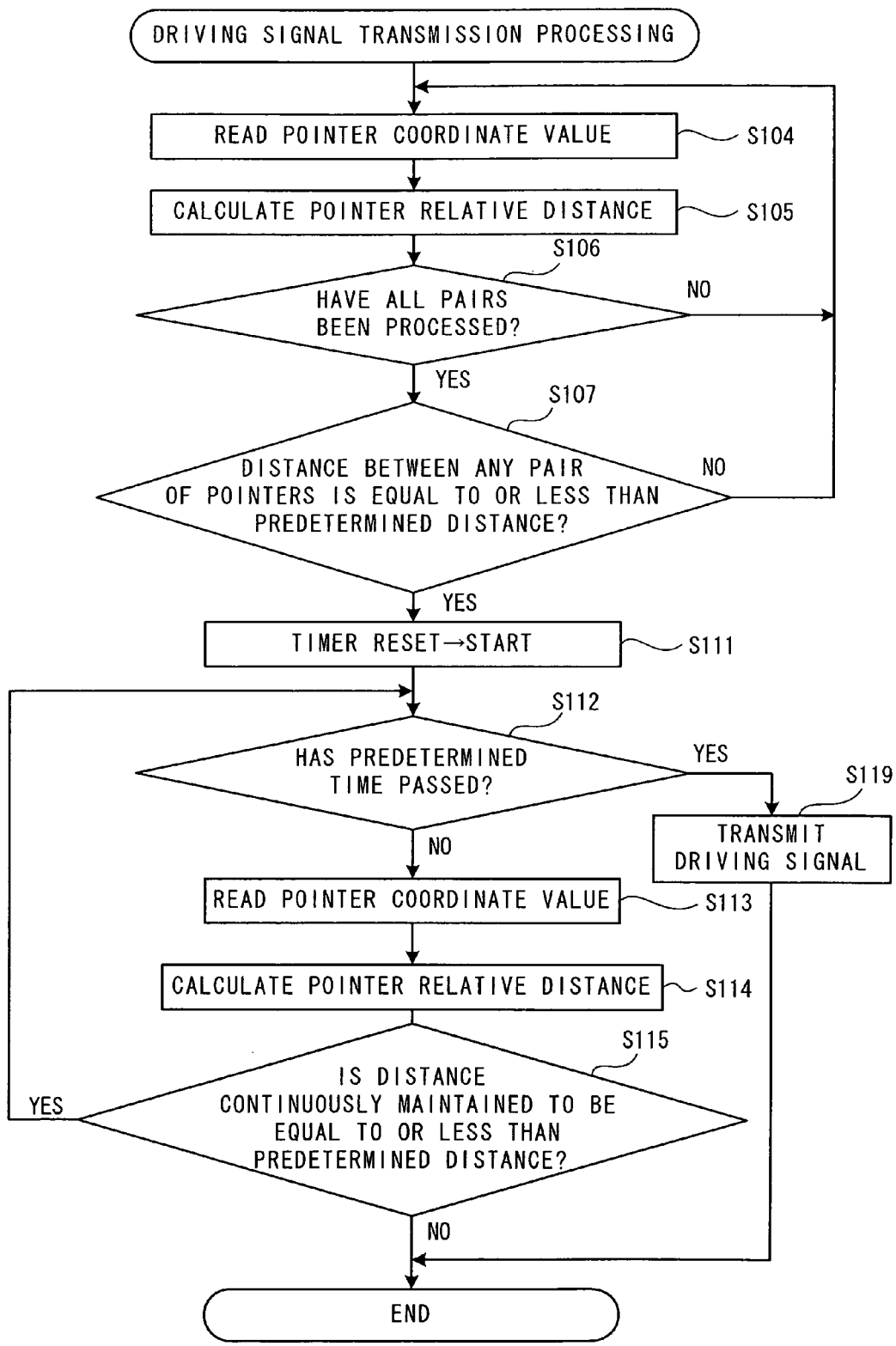
FIG. 13 is a flowchart of driving signal transmission processing according to a first modified embodiment.

During this period, if the relative distance between the pointers, for which it has been determined at step S107 that the relative distance is equal to or less than the predetermined distance, exceeds the predetermined distance (NO at step S115), the driving signal transmission processing shown in FIG. 13 is terminated immediately.

On the other hand, if it is determined that the relative distance between the pointers, for which it has been determined at step S107 that the relative distance is equal to or less than the predetermined distance, is continuously maintained to be equal to or less than the predetermined distance for the predetermined time or more (YES at step S112), the CPU 11 performs processing for transmitting a driving signal to the remote controls that control these pointers (step S119). Thereafter, the CPU 11 terminates the driving signal transmission processing.

As described above, in the driving signal transmission processing according to the first modified embodiment shown in FIG. 13, when the user operates the remote control, if the user's pointer accidentally approaches the pointer controlled by another user, the driving signal is not transmitted to the remote controls until the predetermined time has elapsed. Therefore, it may be possible to accurately make sure that vibration is only generated in the remote controls when the user wants to speak to or get the attention of the other user.

Next, driving signal transmission process according to a second modified embodiment will be described with reference to FIG. 14. Also in the driving signal transmission process according to the second modified embodiment shown in FIG. 14, the processing from reading the pointer coordinate value (step S204) to determining as to whether there is a pair of pointers that have a distance between them which is equal to or less than a predetermined distance (step S207) is the same as the processing at step S14 to step S17 shown in FIG. 8.

When it is determined that there is a pair of pointers whose relative distance is equal to or less than the predetermined distance (YES at step S207), information that identifies the pair of these pointers is stored in the RAM 13. Then, the CPU 11 determines whether remote control operation information has been obtained (step S208). The remote control operation information in the present embodiment refers to information that is transmitted to the display control apparatus 10 via the signal transmitting/receiving portion 64 when the user presses the OK button 66 on the remote control 6 controlling one of the pointers in the pair, the pointers being close to each other within the predetermined distance. When the CPU 11 determines at step S208 that the remote control operation information has been obtained (YES at step S208), the CPU 11 performs processing for transmitting a driving signal to the remote controls that control the pair of pointers, for which it has been determined at step S207 that the relative distance is equal to or less than the predetermined distance (step S209).

As described above, in the driving signal transmission processing according to the second modified embodiment, when the user operates the remote control, if the user's pointer accidentally approaches the pointer controlled by another user, the driving signal is not transmitted to the remote controls unless the user presses the OK button 66. Therefore, it is possible to accurately make sure that vibration is only generated in the remote controls when the user wants to speak to or get the attention of the other user.

In the above-described embodiment and modified embodiments, the vibration generating device 65 may be driven only in the remote control corresponding to one of the pair of pointers positioned within the predetermined distance from each other. In particular, only the remote control corresponding to the pointer approached by another pointer or only the remote control whose OK button 66 has not been pressed may be vibrated. In other words, the vibration generating device 65 may not be driven in the remote control corresponding to the pointer that has approached the other pointer, or in the remote control whose OK button 66 has been pressed. For example, at step S209 of the driving signal transmission processing (refer to FIG. 14) according to the second modified embodiment, amongst the remote controls corresponding to the pointers that are close to each other within the predetermined distance, the driving signal may be transmitted to only the remote control that is not the transmission source of the remote control operation information. As in each of the above-described embodiments, if the driving signal is transmitted to all the remote controls that correspond to the pointers, the relative distance between which is equal to or less than the predetermined distance, the user who wants to speak to or get the attention of the other user can confirm whether the user definitely causing vibration in the other user's remote control.

In order to confirm whether the user is definitely causing vibration in the other user's remote control, the display state of the pointer corresponding to the remote control in which the vibration generating device 65 is driven may be changed. For example, the display state may be changed by changing the color of the pointer, flashing the pointer, or changing the pointer size for a predetermined time period including the time period during which the vibration generating device 65 is driven. Display state change processing that may be performed in such a case will be described with reference to FIG. 15 and FIG. 16.

First, a remote control information data table 1710 that may be used when the display state change process is performed will be described with reference to FIG. 15. As shown in FIG. 15, the remote control ID, the user ID, the pointer coordinate value, the pointer shape, and a change state are stored in the remote control information data table 1710. The remote control ID, the user ID, the pointer coordinate value, and the pointer shape are the same information as in the above-described embodiment, so an explanation thereof is omitted.

Figure 14:
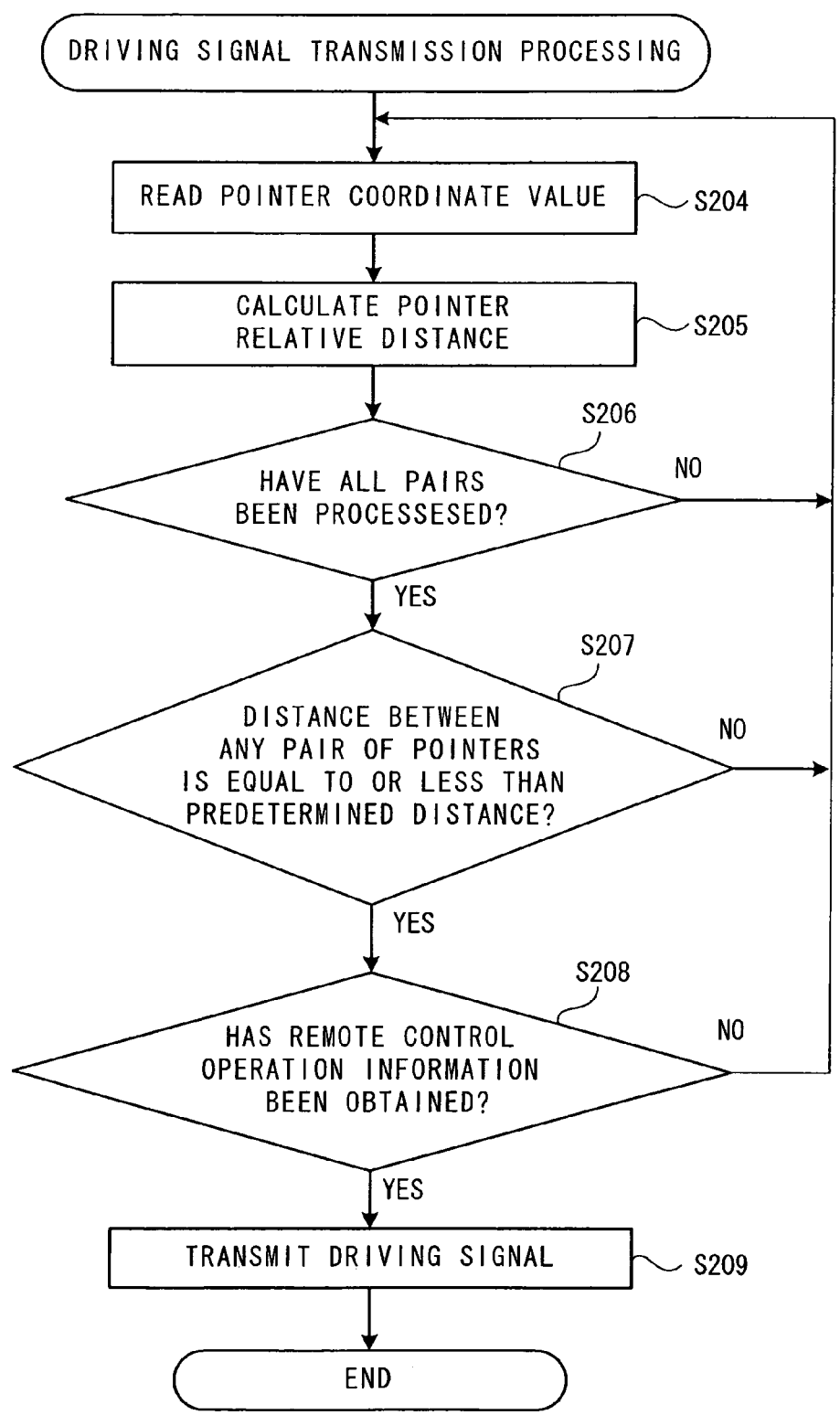
FIG. 14 is a flowchart of driving signal transmission processing according to a second modified embodiment.

The change state refers to information for identifying the remote control to which the driving signal is transmitted in the driving signal transmission processing (FIG. 9, FIG. 13 and FIG. 14). More specifically, if a value of 1 is stored as the change state, it means that the driving signal was transmitted to the remote control of the corresponding remote control ID during a past predetermined time period. If a value of 0 is stored, it means that the driving signal was not transmitted. Note that when the remote control information data table 1710 is created, all the change states are set to an initial value of 0.

Figure 16:
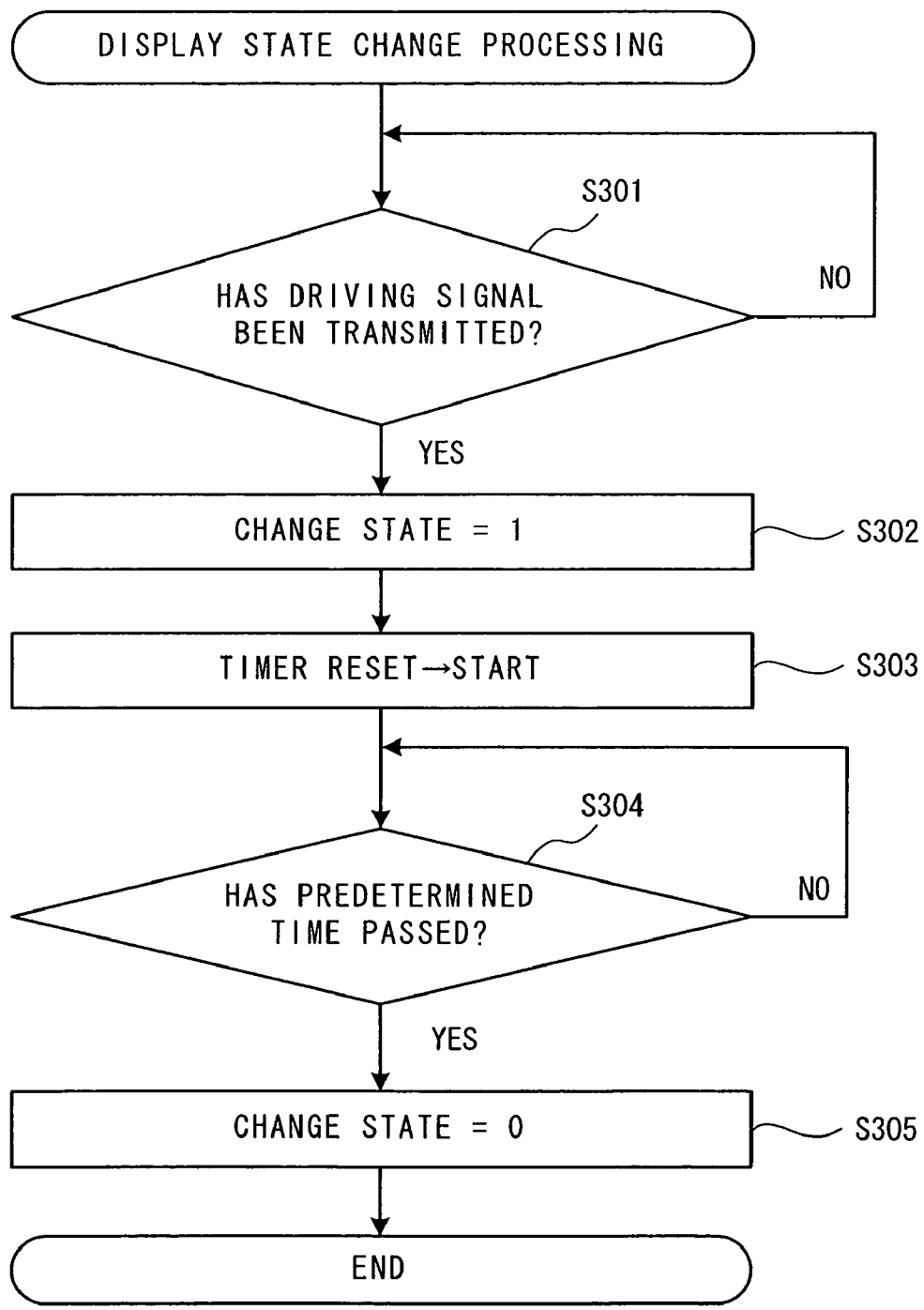
FIG. 16 is a flowchart of the display state change processing.

The display state change processing will be described below with reference to FIG. 16. The display state change processing is performed continuously and repeatedly, in parallel with the driving signal transmission processing. First, it is determined which remote control the driving signal has been transmitted to in the driving signal transmission processing (FIG. 9, FIG. 13 and FIG. 14) (step S301). When there is a remote control to which the driving signal has been transmitted (YES at step S301), the change state corresponding to the remote control ID of the remote control is changed to 1 (step S302). After a timer has been reset temporarily, the timer is started (step S303). The timer measures the elapsed time from when the change state is updated to 1. When a predetermined time (for example, five seconds) has elapsed (YES at step S304), the change state is returned to the initial value of 0 (step S305), and the processing ends.

In the pointer generation process shown in FIG. 7, the display data is created by referring to the change state that is stored in the remote control information data table 1710 by the display state change process (step S7). More specifically, if the same display color (black, for example) is initially used for all the pointers, for example, the display color of only the pointer corresponding to the remote control ID for which 1 is stored as the change state may be changed to a different color (red, for example). Alternatively, only the pointer corresponding to the remote control ID for which 1 is stored as the change state may be flashed, or the pointer size may be changed. As described above, the change state is returned to the initial value of 0 after the predetermined time has passed. Therefore, the display state of the pointer corresponding to the remote control to which the driving signal has been transmitted is changed up until when the predetermined time has elapsed after the driving signal has been transmitted. Because the display state of the pointer is changed in this manner, the user can confirm in which user's remote control the vibration generating device 65 is being driven, while looking at the pointers. Thus, the user can speak to or get the attention of the other user reliably.

The configurations and processes that have been explained in the above-described embodiment are only examples, and it is needless to say that various modifications can be made. For example, although the video conference system 100 of the present embodiment uses a client to server configuration, a peer to peer (P2P) configuration may be used. In this case, various processing performed by the display control apparatus 10 may be performed at the terminal device 50 at each of the bases 30.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A display control apparatus that receives information from remote controls and that controls a display device, comprising:
    a remote control information obtaining device that obtains remote control information that includes, of pointer coordinate information and remote control identification information, at least the remote control identification information, the pointer coordinate information being position information for displaying a pointer corresponding to each of the remote controls on the display device, the remote control identification information being information for identifying each of the remote controls;
    a display data creation device that, based on the remote control information obtained by the remote control information obtaining device, creates display data for displaying pointers on the display device, the display data including identification information corresponding to the remote control identification information;
    a display data output device that outputs to the display device the display data created by the display data creation device;
    a distance determination device that calculates a relative distance between display positions of the pointers on the display device based on the remote control information obtained by the remote control information obtaining device, and determines whether the relative distance is larger than a predetermined distance; and
    a driving signal transmission device that transmits a driving signal to a drive target remote control, the driving signal causing a notification device provided in the drive target remote control to be driven, the drive target remote control being at least one of remote controls corresponding to closely located pointers, the closely located pointers being the pointers for which the distance determination device has determined that the relative distance is equal to or less than the predetermined distance.

2. The display control apparatus according to claim 1, further comprising:
    a timer that counts an elapsed time during which the closely located pointers maintain a state where the relative distance is equal to or less than the predetermined distance, wherein
    the driving signal transmission device transmits the driving signal when the elapsed time counted by the timer is equal to or more than a predetermined time.

3. The display control apparatus according to claim 1, wherein
    if predetermined operation information is obtained from a remote control corresponding to one of the closely located pointers, the driving signal transmission device transmits the driving signal to another remote control corresponding to the other of the closely located pointers amongst the remote controls, taking the other remote control as the drive target remote control.

4. The display control apparatus according to claim 1, wherein
    the driving signal transmission device transmits the driving signal to all remote controls corresponding to the closely located pointers amongst the remote controls, taking the all remote controls as the drive target remote controls.

5. The display control apparatus according to claim 1, wherein
    the distance determination device determines the display position of the pointer based on the pointer coordinate information included in the remote control information obtained by the remote control information obtaining device, and calculates the relative distance from the display position of the pointer to the display positions of each one of the other pointers.

6. The display control apparatus according to claim 5, wherein
    if the pointer coordinate information is not included in the remote control information obtained by the remote control information obtaining device, the distance determination device takes the display position of the pointer to be a predetermined position on the display device, and calculates the relative distance from the display position of the pointer to the display positions of each one of the other pointers.

7. The display control device according to claim 1, further comprising:
    a user information storage device that stores user information that is information relating to users; and
    a correspondence information storage device that stores correspondence information that is information that associates the user information with the remote control identification information, wherein
    the display data creation device creates display data including the user information based on the correspondence information.

8. The display control apparatus according to claim 7, wherein:
    the user information storage device stores the user information that includes a user name; and
    the display data creation device creates display data that includes the user name.

9. The display control apparatus according to claim 1, wherein
    at least during a predetermined time after the driving signal transmission device has transmitted the driving signal to the drive target remote control, the display data creation device creates display data that displays the pointer corresponding to the drive target remote control in a different state from the other pointers.

10. The display control apparatus according to claim 1, wherein
if the pointer coordinate information is not included in the remote control information obtained by the remote control information obtaining device, the display data creation device creates display data for displaying the pointer at a predetermined position on the display device.

11. A remote control, comprising:
a remote control information transmission device that transmits to the display control apparatus according to claim 1 the remote control information including at least the remote control identification information;
a notification device that gives a notification to an operator of the remote control;
a driving signal receiving device that receives from the display control apparatus the driving signal for causing the notification device to be driven; and
a driving device that drives the notification device in response to the driving signal.

12. The remote control according to claim 11, wherein the notification device is a vibration generating device that vibrates the remote control itself.

13. A video conference system that includes terminal devices mutually connected via a network, each of the terminal devices being connected to a remote control and a display device, the video conference system comprising:
a remote control information obtaining device that obtains remote control information that includes, of pointer coordinate information and remote control identification information, at least the remote control identification information, the pointer coordinate information being position information for displaying a pointer corresponding to each of the remote controls on the display device, the remote control identification information being information for identifying each of the remote controls;
a display data creation device that, based on the remote control information obtained by the remote control information obtaining device, creates display data for displaying pointers on the display device, the display data including identification information corresponding to the remote control identification information;
a display data output device that outputs to the display device the display data created by the display data creation device;
a distance determination device that calculates a relative distance between display positions of the pointers on the display device based on the remote control information obtained by the remote control information obtaining device, and determines whether the relative distance is larger than a predetermined distance; and
a driving signal transmission device that transmits a driving signal to a drive target remote control, the driving signal causing a notification device provided in the drive target remote control to be driven, the drive target remote control being at least one of remote controls corresponding to closely located pointers, the closely located pointers being the pointers for which the distance determination device has determined that the relative distance is equal to or less than the predetermined distance.

* * * * *